United States Patent [19]

Rehrig

[11] Patent Number: 4,824,129
[45] Date of Patent: Apr. 25, 1989

[54] PLASTIC DOLLY WITH PROTECTIVE CAPS

[75] Inventor: Houston Rehrig, Pasadena, Calif.

[73] Assignee: Rehrig International, Inc., Richmond, Va.

[21] Appl. No.: 107,052

[22] Filed: Oct. 13, 1987

[51] Int. Cl.$^4$ .............................................. B62B 3/02
[52] U.S. Cl. .................................. 280/79.11; 108/901; 403/408.1
[58] Field of Search ...................... 280/79.1 R, 79.1 A, 280/166, 164 A, 164 R, 169; 108/901, 56.1; 403/408.1, 231, 375

[56] References Cited

U.S. PATENT DOCUMENTS

| | | | |
|---|---|---|---|
| 1,777,694 | 10/1930 | Halteman | 280/79.1 R |
| 3,582,102 | 6/1971 | Bewick | 280/79.1 R |
| 3,824,933 | 7/1974 | Lind | 108/51 |
| 3,902,692 | 9/1975 | Skinner | 108/56 |
| 4,077,644 | 3/1978 | Roby et al. | 280/79.1 R |
| 4,497,260 | 2/1985 | Bucher | 108/901 |
| 4,720,115 | 1/1988 | Rehrig | 280/79.1 R |

FOREIGN PATENT DOCUMENTS 2057361 6/1971 Fed. Rep. of Germany ...... 108/901

OTHER PUBLICATIONS

"Dolly Trucks", Catalogue No. L-292: 1945, The Colson Corp., Ohio, Cooper Catalogue, 1984-1985, p. 42.

Primary Examiner—David M. Mitchell
Attorney, Agent, or Firm—Banner, Birch, McKie & Beckett

[57] ABSTRACT

An improved plastic dolly is disclosed. The plastic dolly includes a pair of longitudinal side members and a pair of transverse end members coupled by lap joints to form a preferably rectangular frame. Plastic riser pads are disposed on each of the members and have protective caps disposed thereon to protect items being transported by the dolly. The riser pad has a series of slots disposed around its lower edge for receiving complimentary tabs disposed on the lower inner edge of the protective pad. Protrusions on the tabs engage shoulder portions of the slots to secure the protective cap on the riser pad.

1 Claim, 5 Drawing Sheets

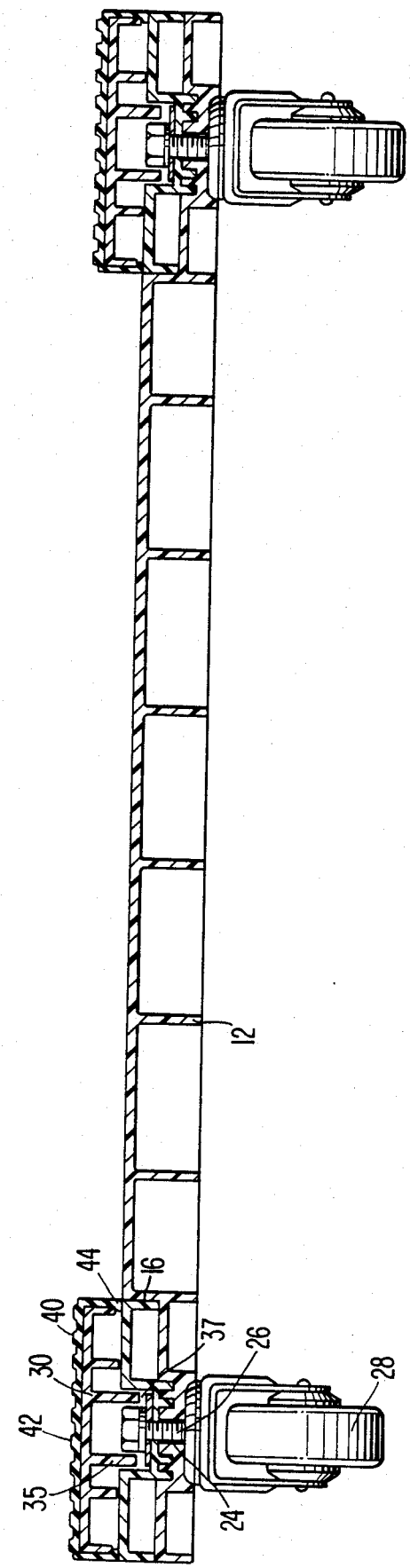

PLASTIC DOLLY WITH PROTECTIVE CAPS

CROSS REFERENCE TO RELATED APPLICATIONS

This application is related to Ser. No. 858,671 filed on May 2, 1986, now U.S. Pat. No. 4,720,115, and entitled "Plastic Dolly", and application Ser. No. 107,305, filed on Oct. 13, 1987 and entitled "Improved Plastic Dolly", both of which are copending and incorporated by reference.

TECHNICAL FIELD

The present invention pertains to plastic dollies. More particularly, the present invention pertains to an improved plastic dolly having protective caps for protecting items transported on the dolly.

BACKGROUND OF THE INVENTION

Typically, dollies are made of relatively heavy, solid wood rectangles or wood slats with a caster fastened on the underside of each corner. In order to protect items transported on these dollies it is often customary to provide raised ends that are covered with a protection device. Often the protection device is a rubber cap or carpeting. Usually, the carpeting or rubber caps are fastened to the wooden dollies using ordinary staples. However, since the wood used for dollies is usually of the hardwood variety, staples tend to fail to properly penetrate the wood. This causes the protective devices to loosen and exposes sharp staple ends that are hazardous to a user.

Recently, plastic dollies have been used. Plastic is preferable to wood for use a dolly material. Plastic is easier to clean and is less dense than wood. Therefore plastic dollies are lightweight and can be strengthened to be sufficiently sturdy. Plastic dollies are also often cheaper than wooden dollies and easier to manufacture. Plastic dollies also need to be covered to protect items being transported. However, dollies made of plastic suffer similar disadvantages as wooden dollies in that it is very difficult to penetrate the plastic material with staples to secure protective coverings; other securing mechanisms must be used to protect the items being moved.

Furthermore, it is highly advantageous and desirable to construct dollies so that they are easily disassembled for repair or replacement of various components of the dolly. This applies to both wooden and plastic dollies. In order to facilitate disassembly of the dolly the protective devices should also be readily removable. Plastic dollies that are easy to assemble and disassemble are also easier and cheaper to manufacture.

SUMMARY OF THE INVENTION

It is an object of the present invention to provide a plastic dolly with a plastic riser pad having a protective cap disposed thereon for protecting transported items.

It is another object of the present invention to provide a plastic dolly which may be easily disassembled for repair or replacement having a plastic riser pad with a protective cap disposed thereon for protecting transported items.

These and other objects are accomplished by the plastic dolly with protective caps of the present invention. The plastic dolly includes a pair of longitudinal side members having end portions with openings for receiving a caster bolt at either end, and a pair of transverse end members also having end portions with caster bolt receiving openings. The end portions interfit to form lap joints coupling the longitudinal side members with the transverse end members to form a frame. The lap joints are securely fastened together at the corners of the frame. A plastic riser pad is disposed on each longitudinal side member and on each transverse end member. The riser pad has a series of slots disposed along its bottom edges. A protective cap is disposed over the plastic riser pad. The protective cap has a series of tabs protruding inwardly within the protective cap and along its bottom edge. The tabs correspond to the slots in the plastic riser pad. The tabs have upper protrusions which are disposed behind a downwardly protruding shoulder portion in the front part of the slots to secure the protective cap in position. In addition, the tabs have lower projections which are forced upwardly by the connection between the riser pad and the members of the dolly to further secure the protective cap in position.

The plastic dolly is easily disassembled to facilitate repair and replacement of damaged components. The plastic riser pad and the protective cap are also removable. This also facilitates cleaning the dolly.

Various additional advantages and features of novelty which characterize the invention are further pointed out in the claims that follow. However, for a better understanding of the invention and its advantages, reference should be made to the accompanying drawings and descriptive matter which illustrate and describe preferred embodiments of the invention.

BRIEF DESCRIPTION OF THE DRAWINGS

FIG. 1A is a partial sectional view, along line 1A—1A, of the plastic dolly of FIG. 1 illustrating the connection between the riser pad and the dolly member with the longitudinal protective cap removed.

DETAILED DESCRIPTION OF PREFERRED EMBODIMENTS

Figure 1:
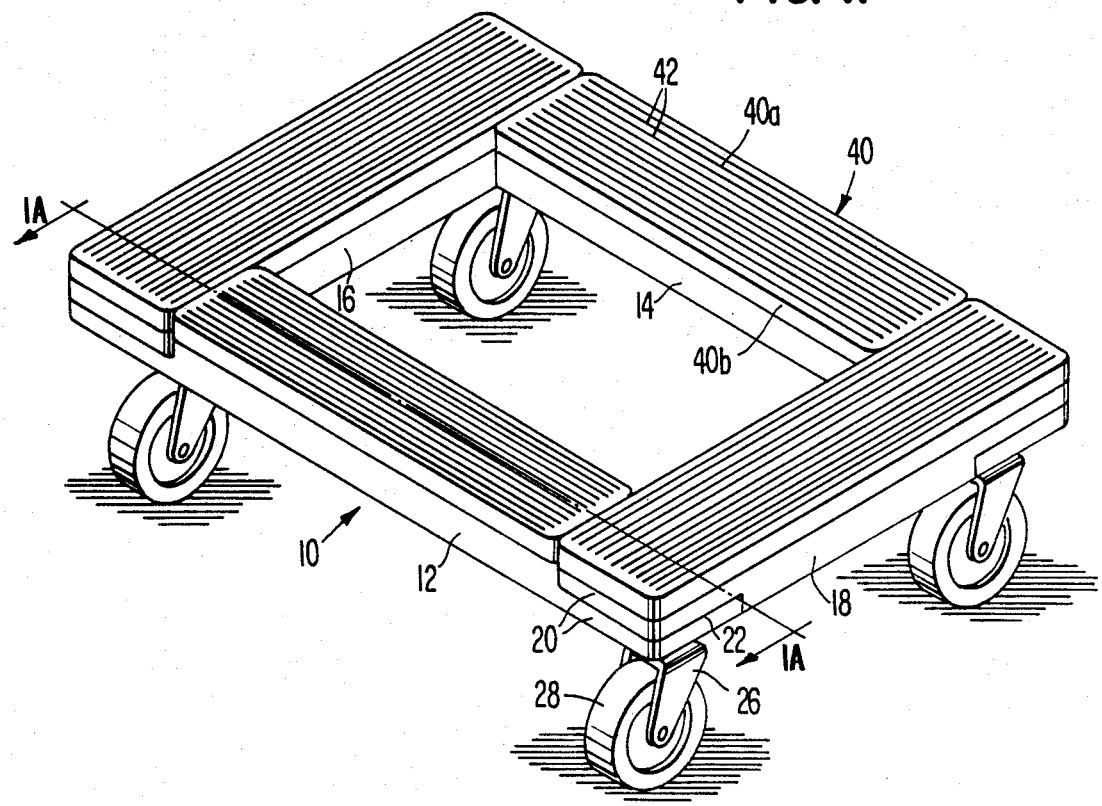
FIG. 1 is a perspective view of a plastic dolly according to the present invention.
Figure 2:
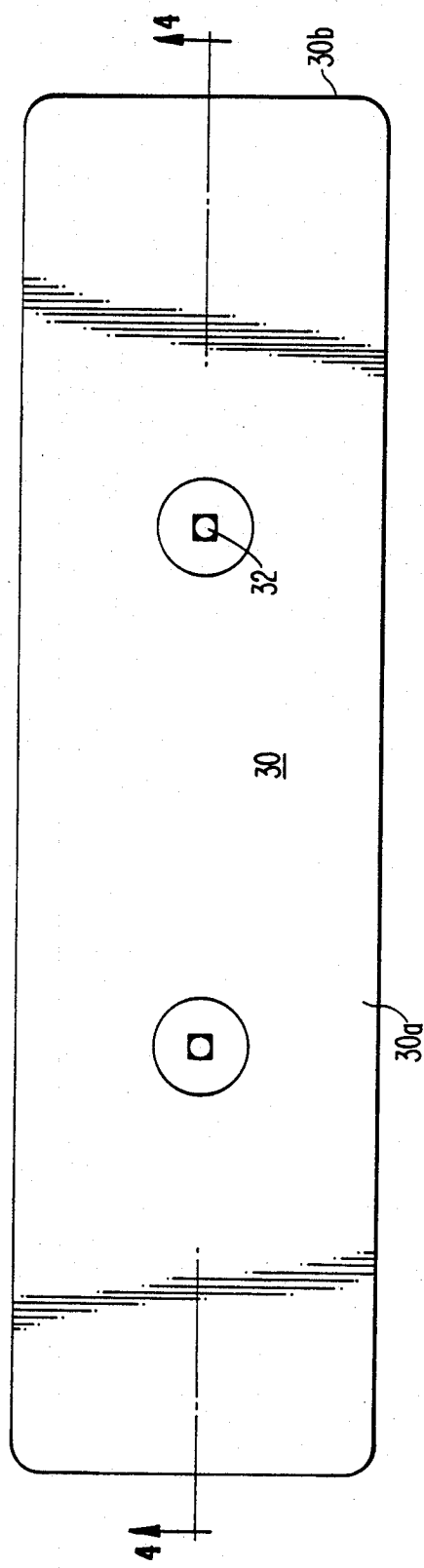
FIG. 2 is a top view of the riser pad.
Figure 3:
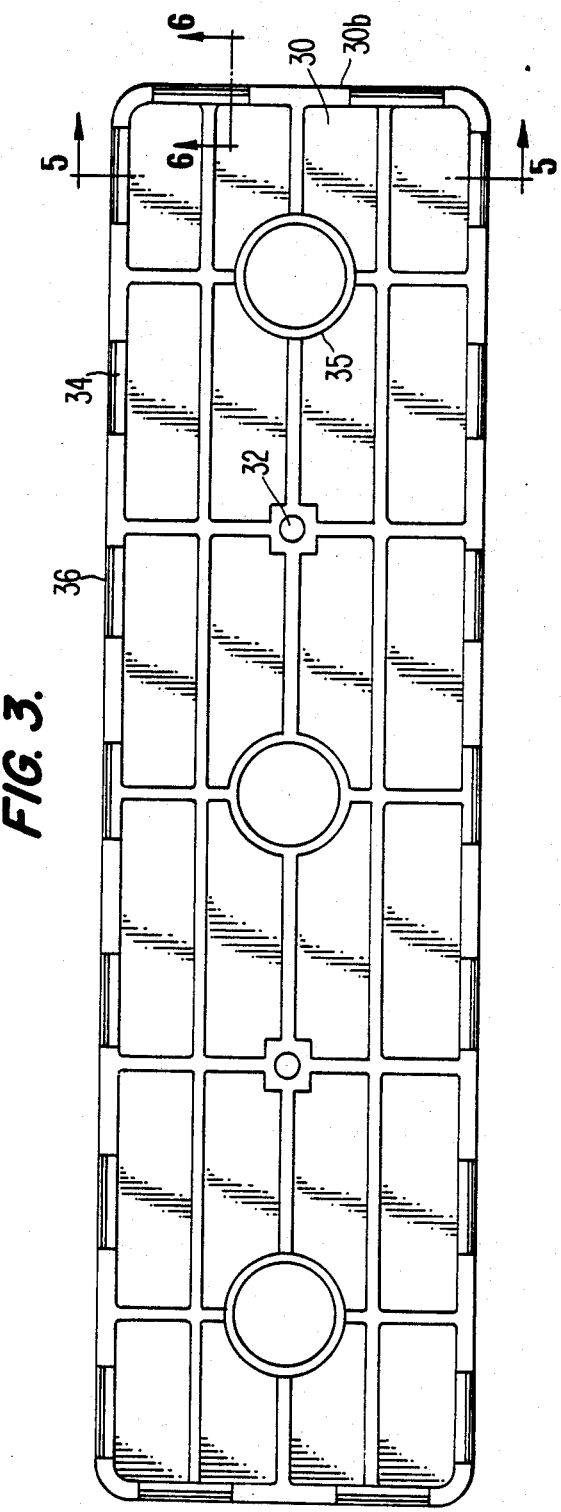
FIG. 3 is a bottom view of the riser pad.
Figure 4:
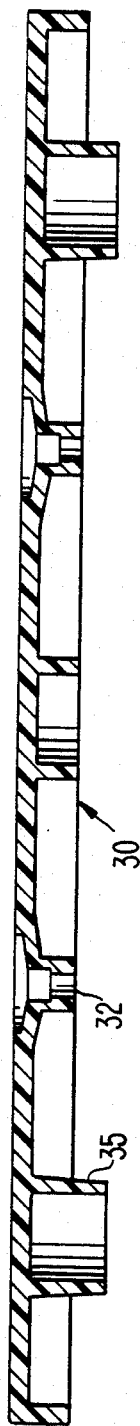
FIG. 4 is a sectional view of the riser pad taken along line 4—4 of FIG. 2.
Figure 6:
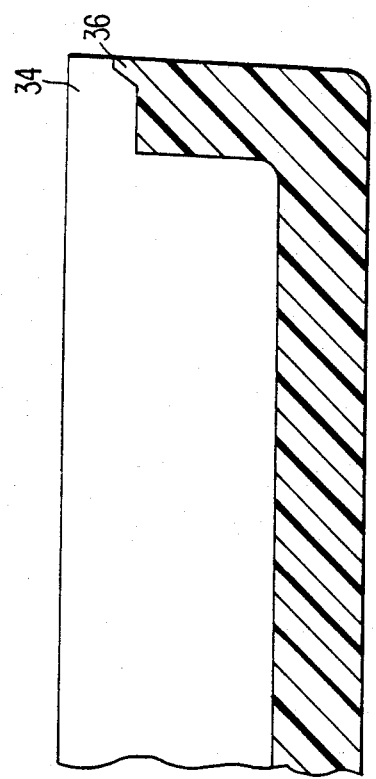
FIG. 6 is a sectional view of the riser pad taken along line 6—6 of FIG. 3.
Figure 5:
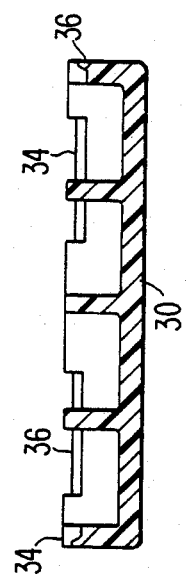
FIG. 5 is a sectional view of the riser pad taken along line 5—5 of FIG. 3.
Figure 7:
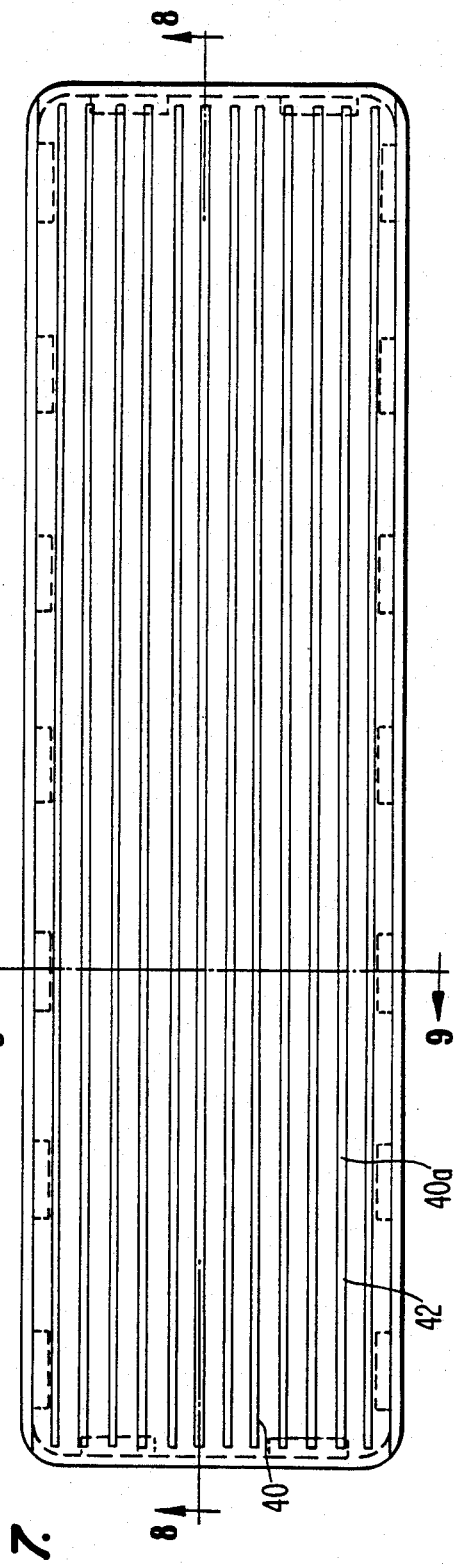
FIG. 7 is a top view of the protective cap.
Figure 8:
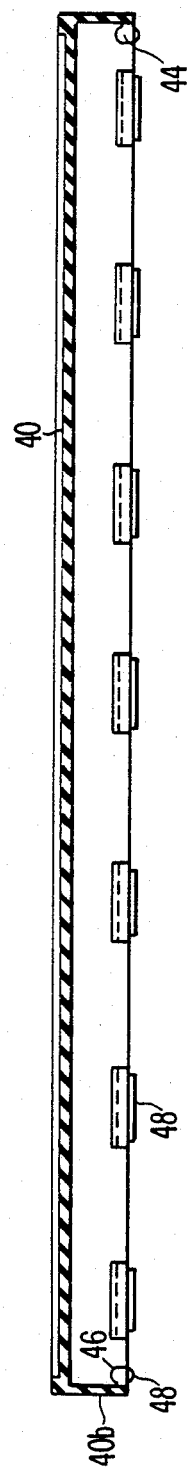
FIG. 8 is a sectional view of the protective cap taken along line 8—8 of FIG. 7.
Figure 9:
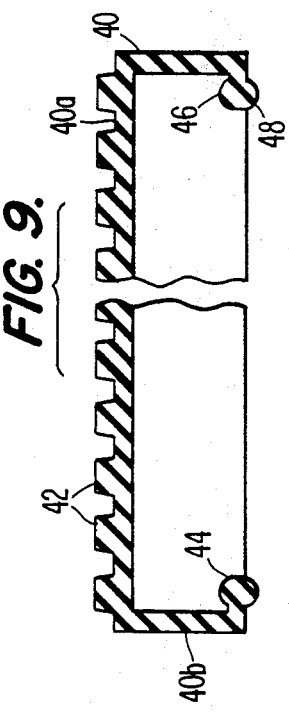
FIG. 9 is a sectional view of the protective cap taken along line 9—9 of FIG. 7.

Referring to FIG. 1, plastic dolly 10 is shown. Dolly 10 includes longitudinal side members 12, 14 and transverse end members 16, 18, coupled to form a frame. Preferably, the frame is rectangular in shape although other quadrilateral shapes may be used, and dollies having more or less than four sides may be used. Members 12, 14, 16, 18 each have two end portions 20 disposed at either end. End portions 20 of adjacent longitudinal side members and transverse end members are coupled to form a lap joint 22. Preferably, end portions 20 are rabbeted, and members 12, 14, 16, 18 are molded from a high density polyethylene. Members 12, 14, 16, and 18 may be appropriately reinforced as taught in the cited related applications. Each of the four corner lap joints 22 includes caster fastening hole 24 for receiving caster bolt 26 which securely fastens the corner joints together. Each caster bolt 26 carries a respective dolly caster wheel 28.

Riser pads 30 are disposed on respective longitudinal side members 12, 14 and transverse end members 16, 18, and protective caps 40 are disposed on each riser pad 30. As best shown in FIGS. 2 through 6, riser pad 30 includes bolt receiving hole 32, and slots 34. Circular projections 35, shown separately in FIGS. 3 and 4, matingly engage the circular caster receiving wells 37 in members 12, 14, 16, 18 to better secure riser pad 30 to the members as shown in FIG. 1A. This connection aids in preventing slippage and further locks riser pad 30 to the dolly members. Riser pad 30 includes top surface 30a and side surfaces 30b disposed around top surface 30a. Slots 34 are disposed in side surface 30b at the lower edge portion of side surface 30b all around riser pad 30. Each slot 34 includes slot shoulder 36 which creates a smaller planar surface area at the outer planar surface of slot 34 than at the inner planar surface of slot 34.

Protective caps 40 include top surface 40a and side surface 40b. Gripping treads 42 are disposed on top surface 40a and tabs 44 are disposed along the bottom of side surface 40b and protrude inwardly. Each tab 44 has upper protrusion 46 and lower protrusion 48. Preferably, protective cap 40 is made from rubber or a similar substance.

When assembled, riser pad 30 is bolted onto longitudinal side members 12, 14 and transverse end members 16, 18. Protective cap 40 is placed over riser pad 30. Tabs 44 of protective cap 40 are disposed within slots 34 of riser pad 30. Upper protusions 46 of tabs 44 extend through the smaller planar surface area of slot 34 and upwardly behind slot shoulder 36. This engagement between upper protrusions 46 and slot shoulders 36 secures protective cap 40 onto riser pad 30. To further secure protective cap 40 onto riser pad 30, lower protrusions 48 on tabs 44 are disposed between riser pad 30 and its respective member 12, 14, 16, 18. As there is no receiving portion for lower protrusion 48 in either riser pad 30 or members 12, 14, 16, 18, it is wedged between riser pad 30 and respective members 12, 14, 16, 18. Because lower protrusion 48 does not compress much, it is forced upwardly by the riser pad 30-member 12, 14, 16, 18 connection. This further secures the engagement between upper protrusion 46 and slot shoulder 36, further preventing upper protrusion 46 from being forced from behind slot shoulder 36 and into the smaller planar surface area of slot 34 through which tabs 44 may be removed.

Numerous characteristics, advantages, and embodiments of the invention have been described in detail in the foregoing description with reference to the accompanying drawings. However, the disclosure is illustrative only and the invention is not limited to the precise illustrated embodiments. Various changes and modifications may be effective therein by one skilled in the art without departing from the scope or spirit of the invention.

I claim:
1. A dolly comprising:
a pair of longitudinal side members having end portions, each said end portion having an opening for receiving a caster bolt;
a pair of transverse end members having end portions, each said end portion having an opening for receiving a caster bolt;
said end portions interfitting to form lap joints coupling said longitudinal side members and said transverse end members to form a frame, said lap joints being securely fastened together at the corners of said frame;
a riser pad having an upper surface and side walls extending therefrom, each side wall includes an inner and outer surface parallel to the longitudinal axis thereof, said riser pad being disposed on at least one of said members and having a plurality of slots disposed along at least a portion of at least one of said side walls, wherein each slot includes a shoulder portion which forms a first planar surface extending from a respective outer wall surface toward a respective inner wall surface along the thickness of said at least one side wall and a second planar surface extending from said respective inner wall surface toward said respective outer wall surface and being in a different plane than said first planar surface, said second planar surface having a larger surface area than said first planar surface; and
a protective cap having an upper surface and side walls extending therefrom, said protective cap being disposed over said riser pad and having a plurality of tabs corresponding to said riser pad slots for engagement therewith, each tab comprising an upper protrusion for engagement with said shoulder portion and a lower protrusion being disposed against respective longitudinal side and transverse end members thereby forcing said upper protrusions upwardly behind said shoulder portion to secure said protective cap on said riser pad.

* * * * *